US005734600A

United States Patent [19]

Dieffenderfer et al.

[11] Patent Number: 5,734,600

[45] Date of Patent: Mar. 31, 1998

[54] POLYNOMIAL MULTIPLIER APPARATUS AND METHOD

[75] Inventors: James N. Dieffenderfer, Apex, N.C.; James W. Dieffenderfer, Owego, N.Y.

[73] Assignee: International Business Machines Corporation, Armonk, N.Y.

[21] Appl. No.: 219,694

[22] Filed: Mar. 29, 1994

[51] Int. Cl.[6] .......... G06F 7/52

[52] U.S. Cl. .......... 364/757

[58] Field of Search .......... 364/757, 759, 364/754, 758; 381/43

[56] References Cited

U.S. PATENT DOCUMENTS

| | | | |
|---|---|---|---|
| 4,216,531 | 8/1980 | Chiu | 364/757 |
| 4,484,301 | 11/1984 | Borgerding et al. . | |
| 4,538,239 | 8/1985 | Magar | 364/759 |
| 4,755,962 | 7/1988 | Mor . | |
| 4,841,468 | 6/1989 | Miller et al. | 364/754 |
| 4,942,608 | 7/1990 | Shigehara | 381/43 |
| 5,231,601 | 7/1993 | Stearns | 364/757 |
| 5,473,559 | 12/1995 | Makino | 364/758 |

OTHER PUBLICATIONS

Waser, Shlomo and Flynn, Michael. *Introduction to Arithmetic for Digital Systems Designers*. New York: Holt, Rinehart and Winston, 1982. pp. 132–135.

"Binary Multiplying Arrangement," *IBM Technical Disclosure Bulletin*, vol. 24, No. 1A, Jun. 1981, pp. 127–129.

*Primary Examiner*—Reba I. Elmore
*Assistant Examiner*—Monica Lewis
*Attorney, Agent, or Firm*—Steven B. Phillips; Thomas F. Galvin; George E. Clark

[57] ABSTRACT

A multiplier efficiently multiplies signed or unsigned binary polynomial operands. The multiplier includes storage means for temporary storage of a current multiplier and a current multiplicand each of which being binary polynomials, one or more Booth decoders for examining multiplier bits iteratively in predetermined groups and presenting a Booth decoder output as one set of inputs to a plurality of delta generators and a partial product delta generator. Another set of inputs to the delta generators and the partial product delta generator is a predetermined group of bits from a multiplicand. The outputs of the partial product delta generator are multiplexed with outputs of the partial product register to provide inputs of an adder array. The adder array has outputs to a parallel adder which generates partial products which are then fed back to the multiplexor. The operation of the multiplier is controlled by a state machine wherein the multiplexor selects one of a plurality of inputs to the multiplexor as output depending upon the state condition of the state machine.

20 Claims, 5 Drawing Sheets

POLYNOMIAL MULTIPLIER APPARATUS AND METHOD

BACKGROUND OF THE INVENTION

1. Field of the Invention

The present invention relates to data processing apparatus and methods and more particularly to apparatus and method for performing a binary multiplication operation on polynomials.

Multiplier apparatus for multiplying polynomials is a basic building block of a data processing system and has been around for more than 50 years. Conventional multiplier apparatus in common use generally has $2^m$ bit parallel inputs for a multiplicand and $2^n$ bit parallel inputs for a multiplier. These inputs are clocked into the multiplier apparatus through separate registers under the control of a clock control circuit. Conventional multiplication techniques use a modified booth algorithm scheme to generate partial products by considering a pair of bits at a time. Booth's algorithm and a commonly implemented modified version of Booth's algorithm are described in detail in *Introduction to Arithmetic for Digital Systems Designers*, by Wasset and Flynn, published by Holt, Rinehart & Winston, 1982. More specifically, at pp. 132–135, multiplication of two binary polynomials is described employing a modified Booth's algorithm technique.

The teachings of Wasset and Flynn as relates to Booth's algorithm and the modified Booth's algorithm technique for binary multiplication of polynomials is hereby incorporated into the present application by reference.

2. Prior Art

The following prior art patents and publications relate to multiplier apparatus and techniques for multiplying binary polynomials in a data processing system.

U.S. Pat. No. 4,538,239 describes a single cycle 16×16 bit multiplier used in a digital signal processing application. The output of the multiplier is connected to an arithmetic logic unit to provide a multiply accumulate operation required in digital signal processing. The multiplier includes 8 delta (Δ) generators and an adder array followed by a ripple carry adder.

The patent does not teach an improved multiplier apparatus and method for handling unsigned operands in multicycle multiply operations as does the present invention.

U.S. Pat. No. 4,755,962 teaches a microprocessor including a modified Booth's algorithm multiplying circuit in the arithmetic logic of the arithmetic logic unit (ALU) data path to reduce the number of cycles to do a multiply in half to improve execution time of the multiplication operation.

The patent describes a straight forward modified Booth's algorithm which has been used for many years. The patent does not address the multiplication of Unsigned binary polynomials as does the present invention.

U.S. Pat. No. 4,841,468 describes a high speed digital multiplier architecture including a single cycle 16×16 bit multiplier. The multiplier employs a standard delta generation (also referred to as partial product) technique followed by a Wallace tree adder followed by a ripple carry adder. In addition to providing a multiplied output of an x and y operand, an additional mode is shown where the x and y operands are concatenated.

The patent does not teach an improved multiplier apparatus and method for handling unsigned operands in multicycle multiply operations as does the present invention.

U.S. Pat. No. 4,484,301 teaches apparatus and method for performing a two's complement single or double decision digital multiply whereby the multiplication is performed in a one's complement format in a gate array assembly and then converted to a two's complement format. The patent does not teach nor suggest multiplication of unsigned polynomials for multiple cycle multiply operations as does the present invention.

*IBM Technical Disclosure Bulletin*, Vol. 24 1A, June 1981, pp. 127–129 teaches a binary multiplying arrangement which examines the two most significant bits of the multiplier instead of the conventional examination of the least significant bits of the multiplier. The publication claims that the method eliminates the preparation in storage of twice the multiplicand (MD) as well as the addition of the shifted multiplicand to the partial product for which additional time and hardware and the addition of one bit to the data path widths and the MD register would otherwise be required. Examining the most significant bits first requires a ripple adder the full width of the product. The product width is a number of bits in the multiplicand plus the number of bits in the multiplier. Although the publication has eliminated a multiplexor in front of the multiplicand, such a multiplexor was added in front of the multiplier and the partial product registers. The publication does not address the multiplication of unsigned binary polynomials in a multiple cycle multiply operation as does the present invention and further requires more hardware, more cycles and has a slower cycle time than the method and apparatus according to the present invention.

SUMMARY OF THE INVENTION

It is an object of the present invention to efficiently multiply signed or unsigned binary polynomial operands in a multiplier including storage means for temporary storage of a current multiplier and a current multiplicand each of which being binary polynomials, one or more Booth decoder circuits (occasionally, Booth decoders are referred to as encoders, but for consistency, the term decoder will be used herein) for examining multiplier bits iteratively in predetermined groups and presenting a Booth decoder output as one set of inputs to a plurality of delta generators and a partial product delta generator where another set of inputs to the delta generators and the partial product delta generator is a predetermined group of bits from a multiplicand, the outputs of the partial product delta generators and the partial product register being multiplexed to inputs of an adder array or tree which provides outputs to a parallel adder which generates partial products which are then fed back to the multiplexor.

The operation of the multiplier is controlled by a state machine wherein the multiplexor selects one of a plurality of inputs to the multiplexor as output depending upon the state condition of the state machine.

It is an advantage of the present invention that multiplication of signed or unsigned binary polynomials may be executed more efficiently with less hardware or one less cycle than prior art multipliers.

The foregoing and other objects features and advantage of the present invention will become more readily apparent from the following detailed description with reference to the accompanying drawing.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

The use of the modified Booth's algorithm employs Booth decoders which reduces the number of partial products by half compared to the above example which examines only one new bit at a time.

Each operand is divided into sets of 3 bits each with adjacent sets sharing a common bit (an overlap of 1 bit). The modified Booth's algorithm can be used with either unsigned or two's complement numbers (the most significant bit of which has a weight of $-2^{n-1}$ for an n bit number), and requires that the multiplier be padded with a zero to the right to form 5 complete groups of 3 bits each. To work with unsigned numbers, the n bit multiplier must also be padded with one or more zeros in the multipliers to the left.

The mathematical derivation of Booth's algorithm and the modified Booth's algorithm follows:

MATHEMATICAL DERIVATIONS
1. Derivation of Booth's Algorithm
LET N = MULTIPLICAND & M = MULTIPLIER $M = -2^{n-1}M_{n-1} + 2^{n-2}M_{n-2} + \ldots 2^{i+1}M_{i+1} + 2^{i}M_i + 2^{i-1}M_{i-1} + \ldots 2^2M_2 + 2^1M_1 + 2^0M_0 +$ $[0 = -2^{n}M_{n-1} + 2 \times 2^{n-1}M_{n-1}]$ (algebraic sign-extension)

$M_p = -2^{n}M_{n-1} + 2^{n-1}M_{n-1} + 2^{n-2}M_{n-2} + \ldots 2^{i+1}M_{i+1}2^{i}M_i + 2^{i-1}M_{i-1} + \ldots 2^2M_2 + 2M_1 + 2^0M_0 (M_p = M)$ $2M = -2^{n}M_{n-1} + 2^{n-1}M_{n-2} + \ldots 2^{i+2}M_{i+1} + 2^{i+1}M_i + 2^{i}M_{i-1} + \ldots 2^3M_2 + 2^2M_1 + 2^1M_0 + 2^0 \times 0 -$ $[M_p = -2^{n}M_{n-1} + 2^{n-1}M_{n-1} + \ldots 2^{i+2}M_{1+2} + 2^{1+1}M_{i+1}2^{i}M_i + \ldots 2^3M_3 + 2^2M_2 + 2^1M_1 + 2^0M_0$ $M = 2^{n-1}(-M_{n-1} + M_{n-2}) + \ldots 2^{i+2}(-M_{i+2} + M_{i+1}) + 2^{i+1}(-M_{i+1} + M_i) + 2^{i}(-M_i + M_{i-1}) + \ldots 2^3(-M_3 + M_2) + 2^2(-M_2 + M_1) +$
$2^1(-M_1 + M_0) + 2^0(-M_0 + 0)$ $M \times N = 2^{n-1}(-M_{n-1} + M_{n-2}) \times N + \ldots 2^1(-M_i + M_{i-1}) \times N + \ldots 2^1(-M_1 + M_0) \times N + 2^0(-M_0 + 0) \times N$ $* \; M \times N = 2^n \times ½[(-M_{n-1} + M_{n-2}) \times N + \ldots ½[(-M_i + M_{i-1}) \times N + \ldots ½[(-M_1 + M_0) \times N + ½[(-M_0 + 0) \times N] \,] \ldots ] \ldots ]$

* IS THE ALGEBRAIC DESCRIPTION OF BOOTH'S ALGORITHM
BOOTH'S ALGORITHM LOOKS AT 1 NEW BIT EACH ITERATION. (MODIFIED BOOTH'S ALGORITHM LOOKS AT 2 NEW BITS EACH ITERATION)

Figure 6:
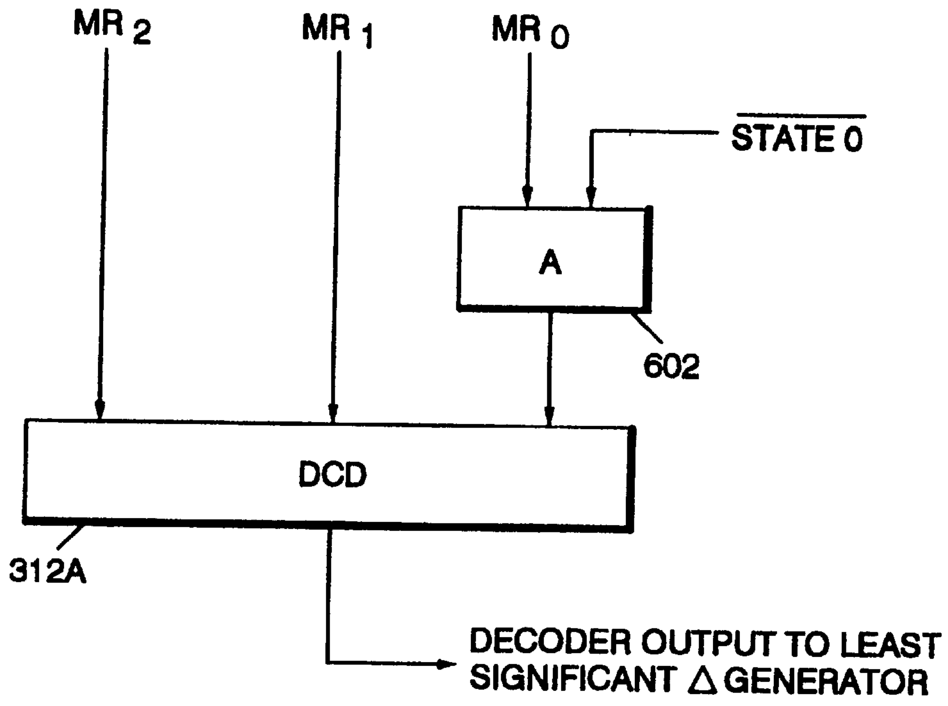

FIG. 6 is a schematic diagram of the least significant decoder with state control in accordance with the present invention.

PRIOR ART

The Wasser and Flynn text discussed above in the Background of the Invention generally describes a multiplier employing Booth's algorithm and modified Booth's algorithm for multiplication of a pair of binary polynomials. Booth's technique generates a partial product for each bit position in the operand such that if there is an 8 bit multiplier there would be 8 partial products generated with the final product having as many bit positions as there are bit positions in the combined operands so that with an 8 bit multiplier and a 8 bit multiplicand the final product would have 16 bit positions.

2. Booth's Algorithm Written in Terms of Changes to the Partial Product (Delta Products) and Partial Products Starting with the algebraic representation of Booth's algorithm, if we let $$\Delta_0=(-M_0+0)\times N \text{ and } \Delta_1=(-M_1+M_0)\times N$$

it follows that $$\Delta_1=(-M_1+M_{1+1})\times N$$

the partial product can be written in terms of Δ:
$p_0=½(\Delta_0+p_{-1})$, where $p_{-1}$ could be used for rounding.
$p_1=½(\Delta_1+p_0)$ it follows that $p_i=½(\Delta_i+p_{-1})$ $$M \times N = 2^n \times 1/2[\underbrace{(-M_{n-1} + M_{n-2}) \times N}_{\Delta_{n-1}} + \ldots 1/2[\underbrace{(-M_i + M_{i-1}) \times N}_{\Delta_i} + \ldots 1/2[\underbrace{(-M_1 + M_0) \times N}_{\Delta_1} + 1/2[\underbrace{(-M_0 + 0) \times N}_{\Delta_0}] \ldots ] \ldots ]$$

$P_0$ $P_1$ $P_i$ $P_{n-1}$

3. Derivation of Modified Booth's Algorithm and Representation in Terms of Changes to the Partial Product (Delta Product) and Partial Products Starting with algebraic description of Booth's Algorithm $$M\times N=2^n\times ½[(-M_{n-1}+M_{n-2})\times N+ \ldots ½[(-M_i+M_{i-1})\times N+ \ldots ½[(-M_2+M_1)\times N+ \ldots ½[(-M_1+M_0)\times N+½[(-M_0+O)\times N]] \ldots ] \ldots ] \ldots ]$$

factor out ¼

$$M\times N=2^n\times ¼[(-2M_{n-1}+2M_{n-2})\times N+(-M_{n-2}+M_{n-3})\times N+ \ldots ¼[(-2M_i-2M_{i-1})\times N+(-M_{i-1}+M_{i-2})\times N+ \ldots ¼[(-2M_1+2M_0)\times N+(-M_0+O)\times N] \ldots ] \ldots ]$$

algebraic representation of modified Booth's algorithm:

$$M \times N = 2^n \times 1/4[\underbrace{(-2M_{n-1} + M_{n-2} + M_{n-3}) \times N}_{\Delta_n} + \ldots 1/4[\underbrace{-2M_i + M_{i-1} + M_{i-2}) \times N}_{\Delta_i} + \ldots 1/4[\underbrace{(-2M_1 + M_0 + O) \times N}_{\Delta_0}] \ldots ] \ldots ]$$

$P_0$ $P_i$ $P_n$

Let $\Delta_0=(-2M_i+M_0+O)\times N$; $P_0=¼(\Delta_0+p_{-1})$ $\Delta_i=(-2M_{i-1}+M_i+M_{i-1})\times N$; $P_i=¼(\Delta_i+p_{i-1})$ 4. Alternate Look at the Modified Booth's Algorithm $$p_i=½(\Delta_i+p_{i-1})$$

$$p_{i+1}=½(\Delta_{i+1}+p_i)=½(\Delta_{i+1}+½(\Delta_i+p_{i-1}))$$

$$p_{i+1}=¼(2\Delta_{i+1}+\Delta_i+p_{i-1})$$

Recall $\Delta_i=(-M_i+M_{i-1})\times N$ $\Delta_{i-1}=(-M_{i+1}+M_i)\times N$ $$p_{i+1}=¼(-2M_{i+1}+2M_i-M_i+M_{i-1})\times N+p_{i-1}$$

$$p_{i+1}=¼(-2M_{i+1}+M_i+M_{i-1})\times N+p_{i-1}$$

5. Booth's Algorithm Applied to Unsigned Numbers

Unsigned numbers can be represented in signed format by sign-extending one bit.

Mathematically if we have an n-bit unsigned # it can be represented as a n+1 signed bit #.

Booth's algorithm for an n-bit unsigned # made signed could be expressed as:

$$M\times N=2^{n+1}\times ½[(-M_n+M_{n-1})\times N+ \ldots ½[(-M_i+M_{i-1})\times N+ \ldots ½[(-M_2+M_1)\times N+½[(-M_1+M_0)\times N+½[(-M_0+O)\times N]]] \ldots ] \ldots ]$$

$M_n$=O (since unsigned #)

$$M \times N = 2^n \times [\underbrace{(M_{n-1}) \times N}_{\downarrow} + \underbrace{1/2[(-M_{n-1} + M_{n-2}) \times N + \ldots 1/2[(-M_i + M_{i-1}) \times N + \ldots 1/2[(-M_0 + O) \times N] \ldots ] \ldots ]]}_{\text{SAME AS SIGNED ALGORITHM}}$$

→→→→→ IF UNSIGNED MULT WHOSE MSB = 1, MUST ADD 1 × N WITHOUT SHIFT! THIS MEANS AN EXTRA CYCLE OR ADDITIONAL ARRAY OR TREE INPUT FOR MULTI-CYCLE MULTS

| 8 bit EXAMPLE | $M_{SB}$ | $M_7$ | $M_6$ | $M_5$ | $M_4$ | $M_3$ | $M_2$ | $M_1$ | $M_0$ | R |
|---|---|---|---|---|---|---|---|---|---|---|
| iteration | 9 | 8 | 7 | 6 | 5 | 4 | 3 | 2 | 1 | |

SE is sign extension bit

6. Modified Booth's Algorithm Applied to Unsigned Numbers

The modified Booth's algorithm has the same problem with unsigned multiplies whose MSB is 1, but must sign-extend the multiplier 2 places.

Booth's modified algorithm for an n bit unsigned # made signed by extending 2 bits is expressed by:

$$M\times N=2^{n+2}\times \tfrac{1}{4}[(-2M_{n-1}+M_n+M_{n-})\times N+\tfrac{1}{4}[(-2M_{n-1}+M_{n-2}+M_{n-3})\times N+\ldots \tfrac{1}{4}[(-2M_i+M_{i-}+M_{i-2})\times N+\ldots \tfrac{1}{4}[(-2M_1+M_0+O)\times N]\ldots]\ldots]]$$

$MSE=M_{n+1}=M_n=O$ (for unsigned)

8. Invention Applied to Booth's Algorithm 4-Bit (+ISE) Proof $$2^4\times \tfrac{1}{2}[-2M_{sc}+2M_3)\times N+\tfrac{1}{2}[(-2M_3+2M_2)\times N+\tfrac{1}{2}[(-2M_2+2M_1)\times N+\tfrac{1}{2}[(-2M_1N+M_0N)]]]]$$

$$2^3(-2M_{sc}+2M_3+2M_2)\times N+2^1(-2M_3)\times N+2^2(-2M_2+2M_1)\times N+2^0(-2M_1N+M_0N)$$

$$[-2^3\times 2M_{sc}+2^4M_3-2^3M_3+2^3M_2-2^2M_2+2^2M_1-2^1M_1+2^0M_0]\times N$$

$$[-2^4M_{sc}+2^3M_3+2^2M_2+2^1M_1+2^0M_0]\times N$$

this is the MD times the MR result.

9. Invention Applied to Modified Booth's Algorithm Recall $$2M-M=M$$

$$M=2^{n-1}(-M_{n-1}+M_{n-2})+2^{n-2}(-M_{n-2}+M_{n-3})+\ldots 2^{i+1}(-M_{i+1}+M_i)+$$

$$M\times N=2^n\times[(M_{n-1})\times N+1/4[(-2M_{n-1}+M_{n-2}+M_{n-3})\times N+\ldots 1/4[(-2M_i+M_{i-2})\times N+\ldots 1/4[(-2M_1+M_0+O)\times N]\ldots]\ldots]]$$

SAME AS SIGNED ALGORITHM

↓
↓

→→→→→ IF UNSIGNED MULT WHOSE MSB = 1, MUST ADD 1 × N WITHOUT SHIFT! THIS MEANS AN EXTRA CYCLE OR ADDITIONAL ARRAY OR TREE INPUT FOR MULTI-CYCLE MULTS

| 8 bit EXAMPLE | $M_{SB}M_{SB}M_7M_6M_5M_4M_3M_2M_1M_0R$ |
|---|---|
| iteration | 5 4 3 2 1 |

7. Invention Applied to Booth's Algorithm

Recall the algebraic representation of Booth's algorithm with one bit of sign extension is:

$$M\times N=2^{n+1}\times \tfrac{1}{2}[(-M_n+M_{n-1})\times N+\ldots \tfrac{1}{2}[(-M_i+M_{i-1})\times N+\ldots \tfrac{1}{2}[(-M_2+M_1)\times N+\tfrac{1}{2}[(-M_i+M_0)\times N+\tfrac{1}{2}[(-M_0+O)\times N]]]\ldots]\ldots]$$

multiply by $2^n$ instead of $2^{n+1}$(means mult by 2 all the way through)

$$M\times N=2^n\times \tfrac{1}{2}[(-2M_n+2M_{n-1})\times N+\ldots \tfrac{1}{2}[(-2M_i+2M_{i-1})\times N+\ldots \tfrac{1}{2}[(-2M_2+2M_1)\times N+\tfrac{1}{2}[(-2M_i+2M_0)\times N+\tfrac{1}{2}[(-2M_0)\times N]\,]0\,]\ldots]\ldots]$$

$\overline{\text{EXPAND}}$ $$M\times N=2^n\times \overset{\Delta_n}{1/2[(-2M_n+2M_{n-1})}\times N+\ldots \overset{\Delta_i}{1/2[(-2M_i+2M_{i-1})}\times N+\ldots \overset{\Delta_1}{1/2[(-2M_2+2M_1)}\times N+\overset{\Delta_0}{1/2[(-2M_1)}\times N+\overset{pp\Delta}{(M_0)\times N]}\,N\ldots]\ldots]$$

The above eq shows 1 less iteration. During the 1st iteration $-2M_1N$ feeds one input of the adder and $M_0N$ feeds the other input of the adder which in subsequent cycles has the partial product as its input.

The Δ equation is $\Delta_i=(-2M_i+2M_{i-1})\times N$. The $M_0N$ is what is called the partial product Δ during the 1st iteration, $\Delta_1$ generator is forced to see a zero instead of $M_0$. Since the effect of $M_0$ is taken care of in the partial product Δ gen.

$$2^1)-M_i+M_{i-1})+\ldots 2^2(-M_2+M_1)+2^1(-M_1+M_0)+2^0(-M_0+O)$$

sign extend 1 bit $$M=2^n(-M_{sc}+M_{n-1})+2^{n-1}(-M_{n-1}+M_{n-2})+\ldots 2^1(-M_i+M_{i-1})\ldots +2^2(-M_2+M_1)+2^1(-M_1+M_0)+2^0(-M_0+O)$$

group in overlapping sets of 3's $$M=-2^nM_{sc}+(2^nM_{n-1}-2^{n-1}M_{n-1})+2^{n-1}M_{n-2}+\ldots[-2^4M_4+(2^4M_3-2^3M_3)+2^3M_2]+[-2^2M_2+(2^2M_1-2M_1)+(2M_0-M_0)]$$

$$M=-2^nM_{sc}+2^{n-1}M_{n-1}+2^{n-1}M_{n-2}+\ldots -2^iM_i2^{i-1}M_{i-1}+2^{i-1}M_{i-2}+\ldots[-2^2M_2+2M_1+M_0]$$

$$M=2^n\times \tfrac{1}{4}[-4M_{sc}+2M_{n-1}+2M_{n-2}+\ldots \tfrac{1}{4}[(-4M_i+2M_{i-1}+2M_{i-2}+\ldots \tfrac{1}{4}[-4M_2+2M_1+M_0]\ldots]\ldots]$$

$$M\times N=2^n\times \tfrac{1}{4}[(-4M_{sc}+2M_{n-1}+2M_{n-2})\times N+\ldots[\tfrac{1}{4}(-4M_i+2M_{i-1}+2M_{i-2})\times N+\ldots \tfrac{1}{4}[(-4M_2+2M_1)\times N+(M_0\times N)]\ldots]\ldots]$$

$\Delta_i=(-4\ M_i+2M_{i-1}+2M_{i-2})\times N$

The $M_0N$ is called the partial product Δ. During the 1st iteration the $\Delta_i$ generator is forced to see a zero instead of $M_0$, since the effect of $M_0$ is taken care of in the partial product Δ gen.

Proof of Invention as Applied to Modified Booth's Algorithm

The following is an 8 bit proof applied to the modified Booth Algorithm.

$$2^8\times \tfrac{1}{4}(-4M_{sc}+2M_72M_6)\times N+\tfrac{1}{4}[(-4M_6+2M_5+2M_4)\times N+\tfrac{1}{4}[(-4M_4+2M_3+2M_2)\times N+\tfrac{1}{4}[(-4M_2+2M_1)\times N+M_0N]]]]$$

$$2^6(-4M_{sc}+2M_7+2M_6)\times N+2^4(-4M_6+2M_5+2M_4)\times N+2^2(-4M_4+2M_3+2M_2)\times N+2^0(-4M_2+2M_1+M_0)\times N$$

$$[-2^8M_{sc}+2^7M_7+2^7M_6-2^6M_6+2^5M_5+2^5M_4-2^4M_4+2^3M_3+2^3M_2-2^2M_2+2^1M_1+2_0M_0]\times N$$

$$[-2^8M_{sc}+2^7M_7+2^6M_6+2^5M_5+2hu\ 4M_4+2^3M_3+2^1M_1+2^0M_0]\times N$$

This is MD times MR

PRIOR ART

Figure 1:
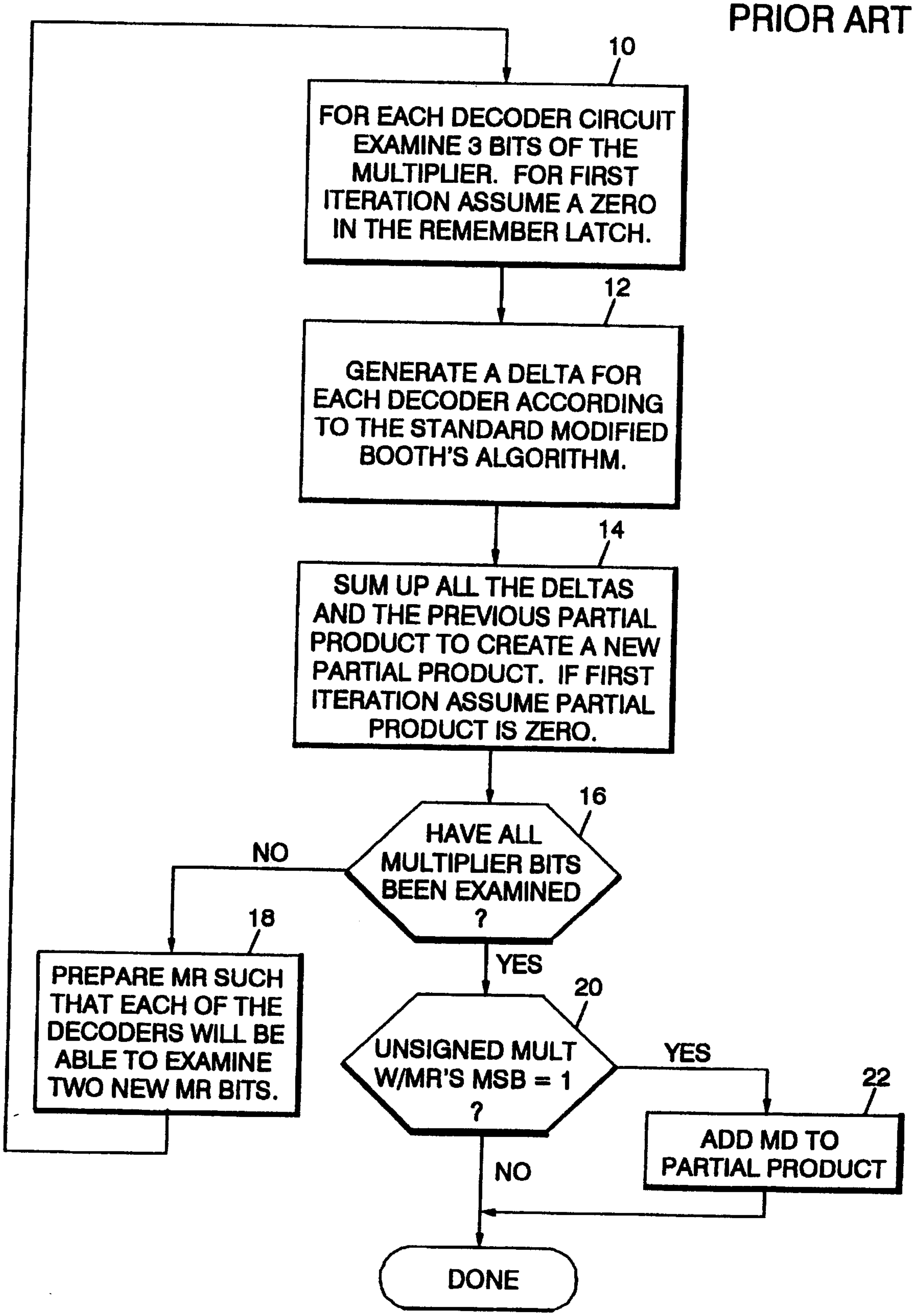
FIG. 1 is a flow chart of a prior art multiplication method employing a modified Booth's algorithm technique.

Referring now to FIG. 1 and Table 1 below, a prior art modified Booth's algorithm multiplier capable of multiplying signed and unsigned numbers will be described. A set of 3 bits of the multiplier are examined by each Booth's decoder in step 10. For the first iteration, a remember latch is presumed to store a zero.

TABLE 1

| MRSE | MRSE | MR7 | MR6 | MR5 | MR4 | MR3 | MR2 | MR1 | MR0 | MRM |
|---|---|---|---|---|---|---|---|---|---|---|
| | | | | | | | | | -1st- | |
| | | | | | | | -2nd- | | | |
| | | | | | -3rd- | | | | | |
| | | | -4th- | | | | | | | |
| -5th- | | | | | | | | | | |

In step 12, a delta is generated for each decoder in accordance with the modified Booth's algorithm as described in the Wasser and Flynn text.

In step 14, all of the deltas and a previous partial product are summed to create a new partial product. For a first iteration, the partial product is presumed to be zero.

In step 16, a test is made to determine if all multiplier bits have been examined or whether further iterations are required. If all multiplier bits have not been examined, step 18 moves to two new bits in the multiplier for each decoder for examination with the most significant bit of the previous iteration thus having a 1 bit overlap between 3 bit sets of the multiplier. On the next iteration, steps 10, 12, 14 and 16 are again executed until all multiplier bits have been examined when the results of step 16 is a YES resulting in a test to determine if there is an unsigned multiplier with a multiplier most significant bit equal to 1 in step 20. If the unsigned multiplier has a most significant bit equal to 1, the multiplicand is added to the partial product in step 22 thus completing the multiplication of the multiplier and the multiplicand by the prior art modified Booth's algorithm technique.

DETAILED DESCRIPTION OF A PREFERRED EMBODIMENT OF THE INVENTION

Figure 2:
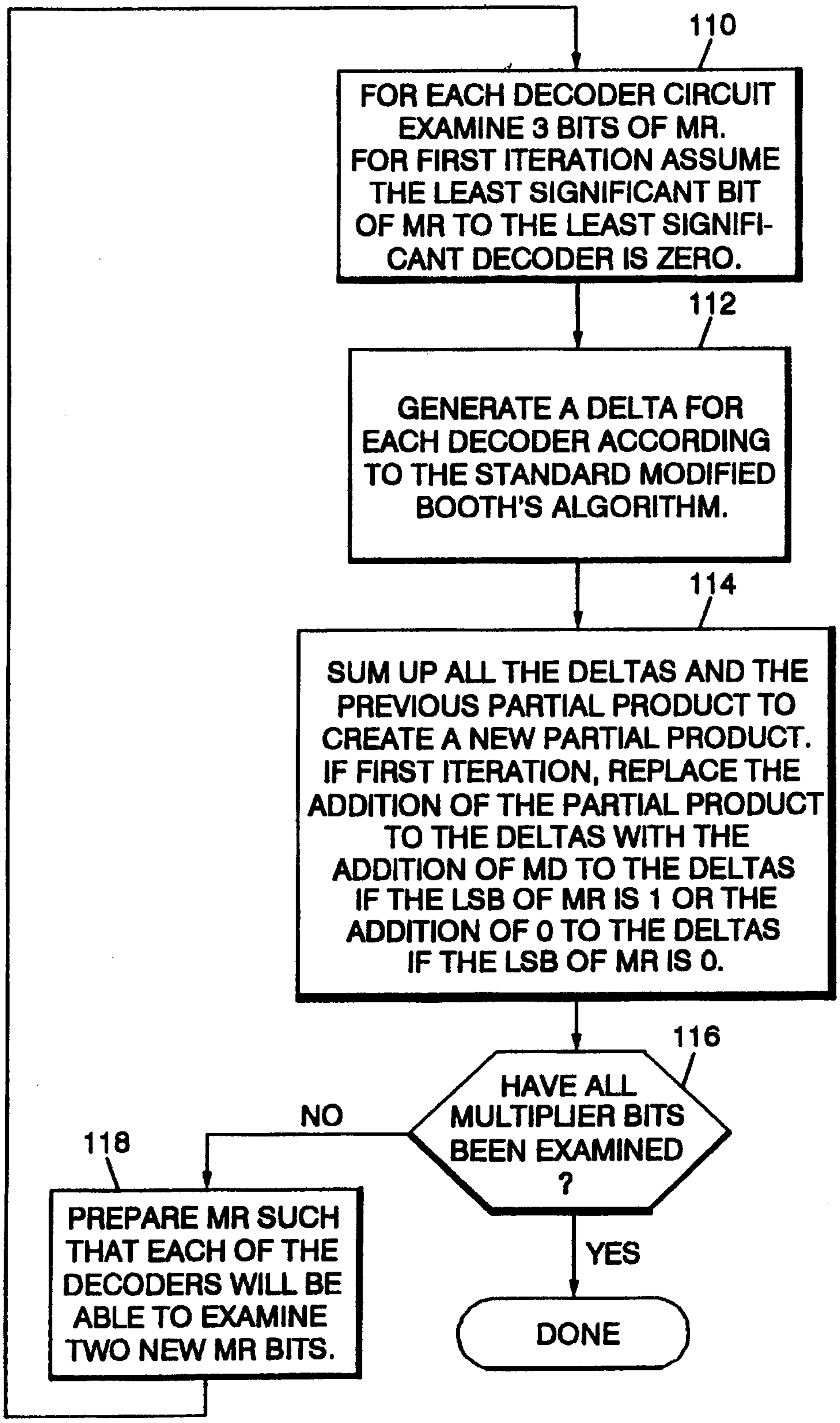
FIG. 2 is a flow chart of a multiplication method employing the present invention.

Referring now to FIG. 2, the method of the present invention will be described with reference to the flow chart of FIG. 2.

In the discussion that follows, MR refers to the multiplier operarid and MD refers to the multiplicand operand of the multiply operation in accordance with the present invention. In step 110, as with step 10 in the prior art method, for each decoder circuit, the multiplier MR is divided into sets of 3 bits each and each 3 bit set is examined by a Booth decoder circuit. For the first iteration, the least significant bit of MR is assumed to be zero for the least significant decoder. (See FIG. 6 for further implementation detail.)

Figure 3:
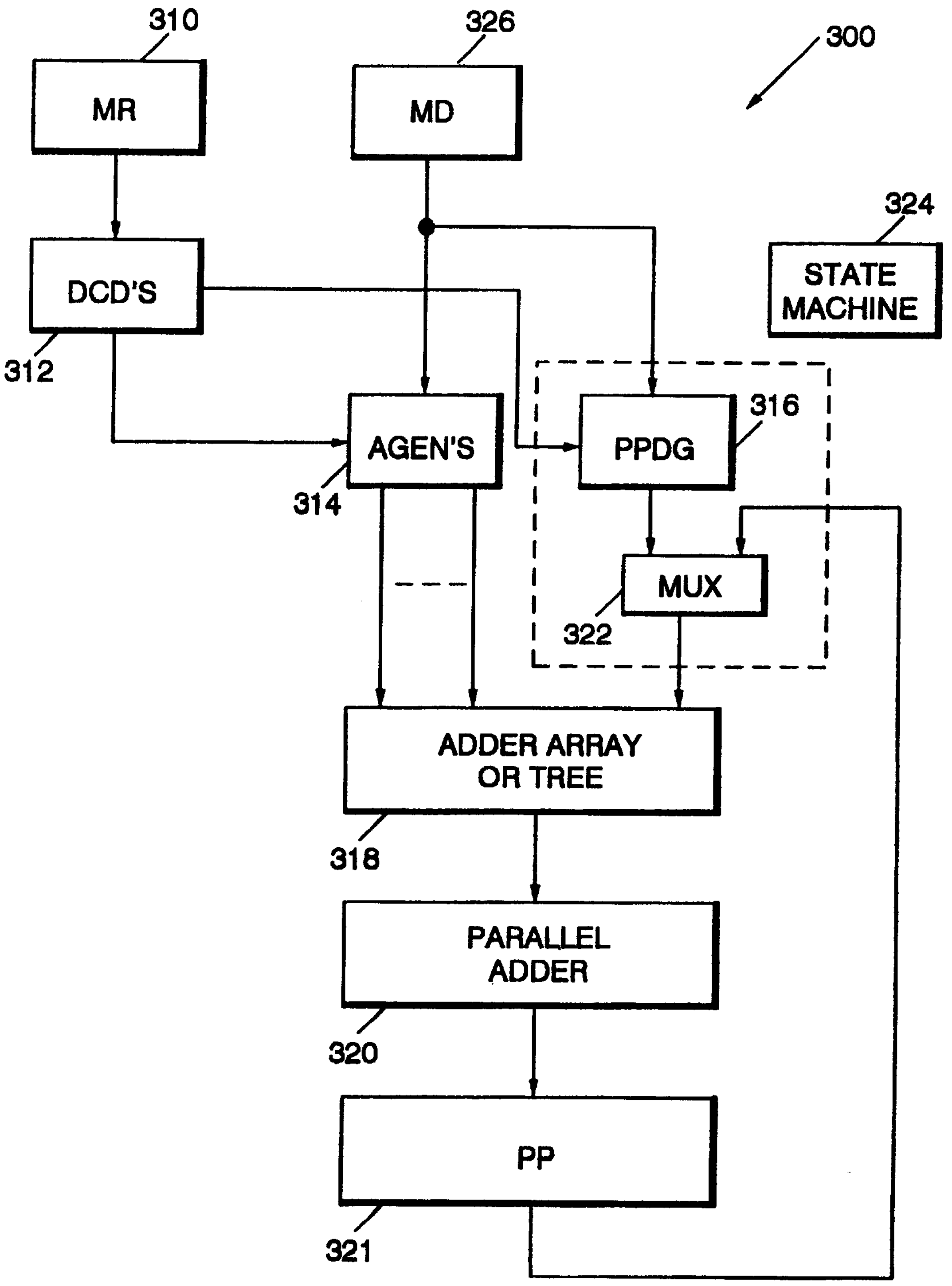
FIG. 3 is a block diagram of a multiplier in accordance with the present invention.

For ease of understanding of the method described with respect to the flow chart of FIG. 2, it may be beneficial to refer to the block diagram of FIG. 3 for a reference to circuits which perform the steps described with respect to FIG. 2. For example, multiplier MR may be stored in a MR register 310 with the outputs presented in groups of 3 bits to the Booth decoders 312.

Each decoder 312 decodes the 3-bit group from MR in accordance with the standard modified Booth's algorithm technique described above. The delta generation is performed by delta generators 314 in step 112.

In step 114, all of the deltas from delta generators 314 and a previous partial product from partial product register 321 or a partial product delta from partial product delta generator 316 are summed to create a new partial product employing adder array, 318 and parallel adder 320. The partial product stored in PP register 321 is connected to multiplexor 322 which multiplexes the new partial product with the outputs of partial product generator 316 to provide a set of inputs to adder array of 318. Multiplexor 322 will be described with reference to FIG. 5 below. If a first iteration is being examined, state machine 324, state 0, causes multiplexor 322 to gate partial product delta generator 316 to adder 318.

A test is then made to determine if all multiplier bits have been examined by step 116. If there are more multiplier bits to be examined, the system then moves to step 118 which then shifts the MR to examine two new bits of MR 310 together with the most significant bit of the bits from the previous iteration set of 3 bits all under the control of state machine 324. Steps 110, 112, 114, 116 and 118 are then executed for each iteration of bits in the MR register 310 until all MR bits have been examined and step 116 indicates that the multiplication has been completed. The multiplier described with respect to FIG. 3 has been generally described in the discussion above of the method for multiplying in accordance with the present invention of FIG. 2.

Figure 4:
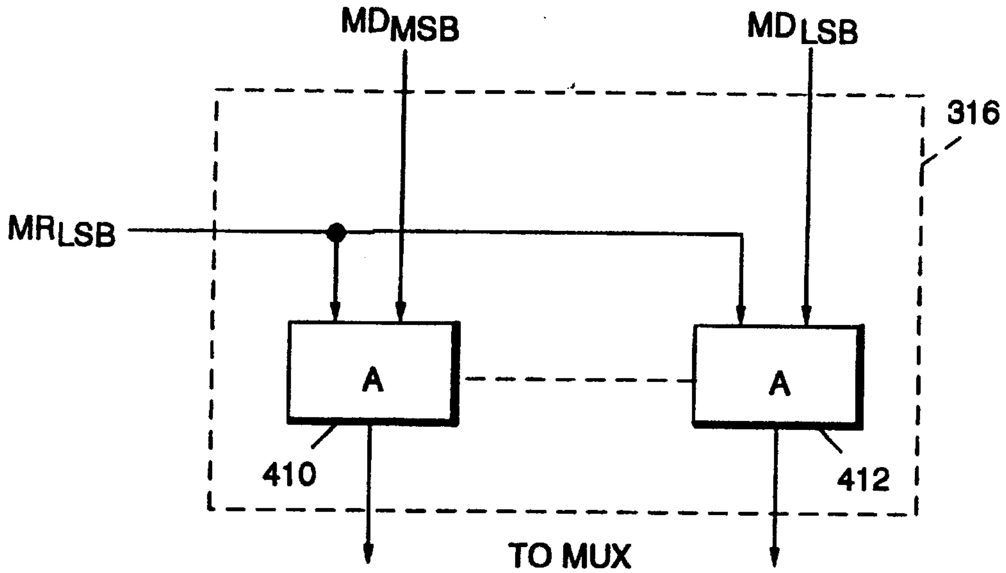
FIG. 4 is a block diagram of a section of a partial product generator in accordance with the multiplier of FIG. 3.

However, the partial product delta generator 316 will now be described with reference to FIG. 4 in more detail. Partial product delta generator 316 includes a series of and gates 410, 412, etc. there being one AND gate for each bit in the multiplicand MD. The least significant bit of MR 310 provides a first input to each of the AND gates 410, 412, etc. in PPDG 316. The second input for each AND gate is the respective bk from the multiplicand 326 such that the least significant bit may be presented as the second input to AND gate 412 and the most significant bit being presented as the second input to AND gate 410 with other bits being connected to other AND gates in PPDG 316. The outputs of the respective AND gates are connected to inputs to multiplexor 322 which will be shown in greater detail with respect to FIG. 5.

Figure 5:
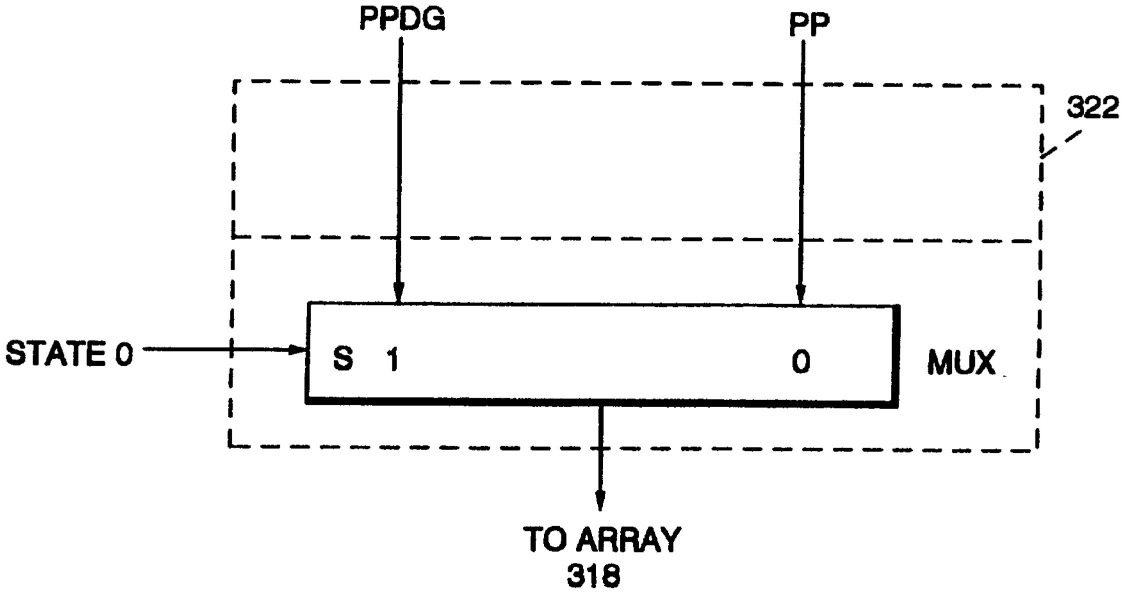
FIG. 5 is a block diagram of a multiplexor in accordance with the multiplier shown in FIG. 3 according to the present invention.

Referring now to FIG. 5, the multiplexor 322 for multiplexing outputs of the partial product register 321 with outputs of partial product delta generator 316 will be described.

Multiplexor 322 has three inputs. A first input is the set of outputs of the PPDG 316, the second set of inputs is the outputs from partial product register 321 and the third input is the state of state machine 324 which controls which of the two inputs will be gated as outputs to adder array 318.

State machine 324 controls the iterative operation of multiplier 300. In the preferred embodiment of the present invention, state machine 324 has four sequential states. (See Table 2) During each of the states of state machine 324, three bits of the multiplier stored in MR 310 are examined. Thus, in state zero, bits MR0, MR1 and MR2 are examined; during state 1 bits MR2, MR3 and MR4 are examined; during state 2 bits MR4, MR5 and MR6 are examined; and during state 3 bits MR6, MR7 and a sign bit MRS are examined. Note that while state 0 selects the three least significant bits for examination, states 1, 2 and 3, respectively, overlap the set of bits examined in the previous state by one bit, thus bit MR2 is examined both in state 0 and state 1, MR4 is examined in both state 1 and state 2 and MR6 is examined both in state 2 and state 3 and that two new bits are examined in each state that were not part of the previous set of bits examined.

As can be seen from the derivation of the mathematics related to the method according to the present invention, a least significant bit input to a least significant bit decoder must be forced to zero during state zero. Thus, referring now to FIG. 6, the implementation of the gating to decoder 312 will be described in further detail. Decoder 312a is the decoder of the three least significant bits of MR 310. Those three least significant bits are respectively MR0, MR1 and MR2. Bits MR1 and MR2 are connected directly to decoder 312a while the least significant bit MR0 is connected to an input of AND gate 602. Since the least significant bit input to decoder 312a must be forced to zero during state zero, the second input to AND gate 602 is the inverse of state zero (NOT state zero) thus forcing AND gate 602 to a zero output during state zero while allowing the actual value of least significant bit MR0 to pass to AND gate 602 to decoder 312a during other states of state machine 324.

TABLE 2

| MRS | MR7 | MR6 | MR5 | MR4 | MR3 | MR2 | MR1 | MR0 |
|---|---|---|---|---|---|---|---|---|
| | | | | | | \| | -lst- | \| |
| | | | | \| | -2nd- | \| | | |
| | | \| | -3rd- | \| | | | | |
| \| | -4th- | \| | | | | | | |

Adder array 318 and parallel adder 320 may be implemented by many well-known circuits which perform the functions of the adder array or parallel adder. These circuits will not be described in further detail herein since they are not novel elements of the present invention.

It can be seen from the preferred embodiment of the invention as described above, that a multiplier circuit according to the present invention can efficiently multiply a first and second operand employing fewer iterations in the Booth's algorithm decoding process than the prior art modified Booth's algorithm and further a latch required by prior art apparatus to store previous iteration most significant bit is not needed for the apparatus and method according to the present invention.

Although the invention has been described with reference to a preferred embodiment thereof, it will be understood by those skilled in the art at various changes in detail including specific circuit design and the like may be made without departing from the spirit or scope of the invention.

What is claimed is:

1. A method for multiplying a plurality of binary polynomials in a data processing system, comprising the steps of:
   - storing said plurality of binary polynomials in a plurality of operand registers;
   - decoding, in one or more decoders, one or more sets of binary bits of a first polynomial of said plurality of binary polynomials stored in a first of said operand registers;
   - generating a delta product from an output of each decoder;
   - summing, trader control of a control means, all delta products and a previous partial product or a second polynomial stored in a second polynomial register in an adder to produce a next partial product;
   - controlling said summing step in response to a state of said decoding step and a value of a predetermined bit of said first polynomial, such that for a first state of said decoding step said second polynomial is summed with said delta products if said predetermined bit has a first value and zero is summed with said delta products if said predetermined bit has a second value, and for other states of said decoding step said previous partial product is summed with said delta products to produce a next partial product;
   - determining after each summing step if all bits in said first polynomial have been decoded; and
   - repeating said steps of decoding, generating a delta product, summing, controlling and determining if all bits of said first polynomial have not been decoded, wherein said next partial product is a final result of multiplication of said plurality of polynomials when the above steps have been performed on all bits of said first polynomial.

2. A method for multiplying a plurality of binary polynomials in a data processing system, according to claim 1, wherein an input to a least significant decoder representative of said predetermined bit of said first polynomial is set to a value of zero during said first state.

3. A method for multiplying a plurality of binary polynomials in a data processing system, according to claim 1, further comprising the step of:
   - advancing to a next state of said decoders to decode a next set of bits of said first polynomial.

4. A method for multiplying a plurality of binary polynomials in a data processing system, according to claim 3, wherein each next set of bits of said first polynomial to be decoded comprises a bit from a previous set of bits and a plurality of bits previously not decoded.

5. A method for multiplying a plurality of binary polynomials in a data processing system, according to claim 4, wherein said bit from a previous set of bits is a most significant bit of said previous set of bits.

6. A method for multiplying a plurality of binary polynomials in a data processing system, according to claim 5, wherein said plurality of bits previously not decoded comprises 2 bits.

7. A method for multiplying a plurality of binary polynomials in a data processing system, according to claim 1, wherein said step of generating a delta product executes a predetermined algorithm.

8. A method for multiplying a plurality of binary polynomials in a data processing system, according to claim 7, wherein said predetermined algorithm is a modified Booth's algorithm.

9. Apparatus for multiplying a plurality of binary polynomials in a data processing system, comprising:
   - means for storing said plurality of binary polynomials in a plurality of operand registers;
   - means for decoding, one or more sets of binary bits of a first polynomial of said plurality of binary polynomials stored in a first of said operarid registers;
   - means for generating a delta product from an output of each decoder;
   - means for summing, under control of a control means, all delta producats and a previous partial product or a second polynomial stored in a second polynomial register in an adder to produce a next partial product;
   - means for controlling said summing, means in response to a state of said decoder and a value of a predetermined bit of said first polynomial such that 'for a first state of said decoder said second polynomial is summed with said delta products if said predetermined bit has a first value and zero is summed with said delta products if said predetermined bit has a second value, and for other states of said decoding means said previous partial product is summed with said delta products to produce a next partial product;

means for determining if all bits in said first polynomial have been decoded; and means for advancing to a next set of bits of said first polynomial if all bits of said first polynomial have not been decoded, wherein said next partial product is a final result of multiplication of said plurality of polynomials if all bits of said first polynomial have been decoded and summed.

10. Apparatus for multiplying a plurality of binary polynomials in a data processing system, according to claim 9, further comprising:

a partial product delta generator connected to outputs of said second polynomial register and said means for generating a delta product.

11. Apparatus for multiplying a plurality of binary polynomials in a data processing system, according to claim 9, Wherein said means for controlling further comprises:

a state machine for controlling gating of sets of bits of said first polynomial to said means for decoding, and for controlling an input, to a selected means for decoding, representative of said predetermined bit of said first polynomial.

12. Apparatus for multiplying a plurality of binary polynomials in a data processing system, according to claim 11, wherein said selected means for decoding is a means for decoding a least significant set of bits of said first polynomial.

13. Apparatus for multiplying a plurality of binary polynomials in a data processing system, according to claim 11, wherein said state machine sets said input to said selected means for decoding to a predetermined value.

14. Apparatus for multiplying a plurality of binary polynomials in a data processing system, according to claim 11, wherein said predetermined value of said input of said selected means for decoding is zero.

15. A multiplier for multiplying two polynomials, comprising:

first and second registers for storing said polynomials;

a state machine controller for controlling operation of said multiplier;

one or more decoders for iteratively decoding sets of bits of a first polynomial under control of said state machine;

one or more delta product generators for generating delta products from inputs connected to said decoders and to said second register;

a partial product delta generator for generating a delta product for combination with a partial product fed back from an output of said multiplier;

a multiplexor for multiplexing outputs of said partial product delta generator with outputs of a partial product register to an input of an adder under the control of said state machine;

an adder for adding outputs from said delta product generators and outputs from said multiplexor to generate a product of said two polynomials as a combination of a plurality of partial products; and a partial product register for storing an output of said adder.

16. A multiplier for multiplying two polynomials, according to claim 15, wherein said adder further comprises:

an adder array connected to outputs of said delta generators and said multiplexor; and a parallel adder having inputs connected to outputs of said adder array and having outputs connected to said partial product register.

17. A multiplier for multiplying two polynomials, according to claim 15, wherein said partial product delta generator further comprises:

a plurality of gates each having a first input connected to a predetermined output of said first register and a second input each connected to an output of said second register.

18. A multiplier for multiplying two polynomials, according to claim 15, wherein said multiplexor further comprises:

a first set of inputs connected to outputs of said partial product register;

a second set of inputs connected to outputs of said partial product delta generator; and a control input connected to an output of said state machine for controlling selection of outputs of said multiplexor in different states of said state machine.

19. A multiplier for multiplying two polynomials, according to claim 18, wherein said multiplexor provides the outputs of said partial product register to said adder in all states of said state machine except for a predetermined state in which outputs of said partial product delta generator are provided to said adder if a predetermined bit in said first register has a first value.

20. A multiplier for multiplying two polynomials, according to claim 15, wherein a least significant decoder comprises:

gate means responsive to a predetermined state of said state machine for forcing a least significant bit input to said decoder to a predetermined value when said state machine is in a first state.

* * * * *